United States Patent [19]
Williams

[11] 3,908,749
[45] Sept. 30, 1975

[54] FOOD SERVICE SYSTEM

[75] Inventor: Leslie G. Williams, Murfreesboro, Tenn.

[73] Assignee: Standex International Corporation, Murfreesboro, Tenn.

[22] Filed: Mar. 7, 1974

[21] Appl. No.: 449,034

[52] U.S. Cl. .................... 165/2; 165/61; 312/236; 165/30
[51] Int. Cl.² ........................................ F25B 13/00
[58] Field of Search .............. 165/2, 30, 64, 61, 48; 312/236, 250

[56] References Cited
UNITED STATES PATENTS

| | | | |
|---|---|---|---|
| 3,199,579 | 8/1965 | Foster et al. | 165/30 |
| 3,275,393 | 9/1966 | Stentz et al. | 312/236 |
| 3,608,627 | 9/1971 | Shevlin | 165/2 |

Primary Examiner—Albert W. Davis, Jr.
Assistant Examiner—Daniel J. O'Connor
Attorney, Agent, or Firm—Wilson, Leonard & Fraser

[57] ABSTRACT

A food service system comprising a cart that is movable from a central food preparation location to a remote food service location. The cart is insulated and has a rack for a plurality of individual meal service trays. Each tray carries cold foods in suitable dishes and a heat-retaining food service unit for food which may be either hot when placed therein or may be heated by connecting each unit to a source of electrical energy at the service location. The cart has conduit means which are connectable to a source of chilled air at the service location in order to keep the cold foods cold for a period of time while the food in the units is being heated to a desired serving temperature. If desired, instead of heating the food in the units at the service location, the heat-retaining units may be heated prior to departure from the food preparation location and will maintain the food therein at elevated temperature for a period of time, even while the cart is connected to the chilled air source for keeping the cold foods at a refrigerated temperature.

12 Claims, 6 Drawing Figures

U.S. Patent Sept. 30,1975 Sheet 1 of 3 3,908,749

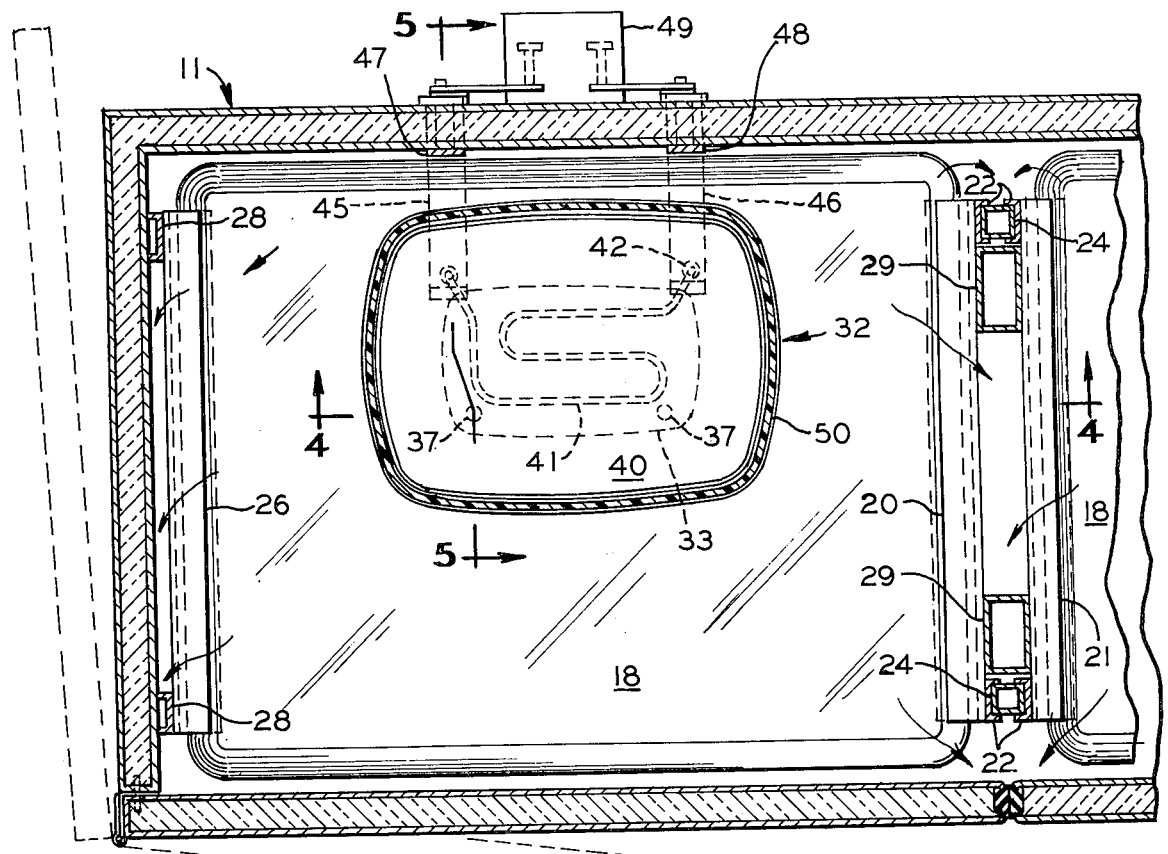
FIG. 3
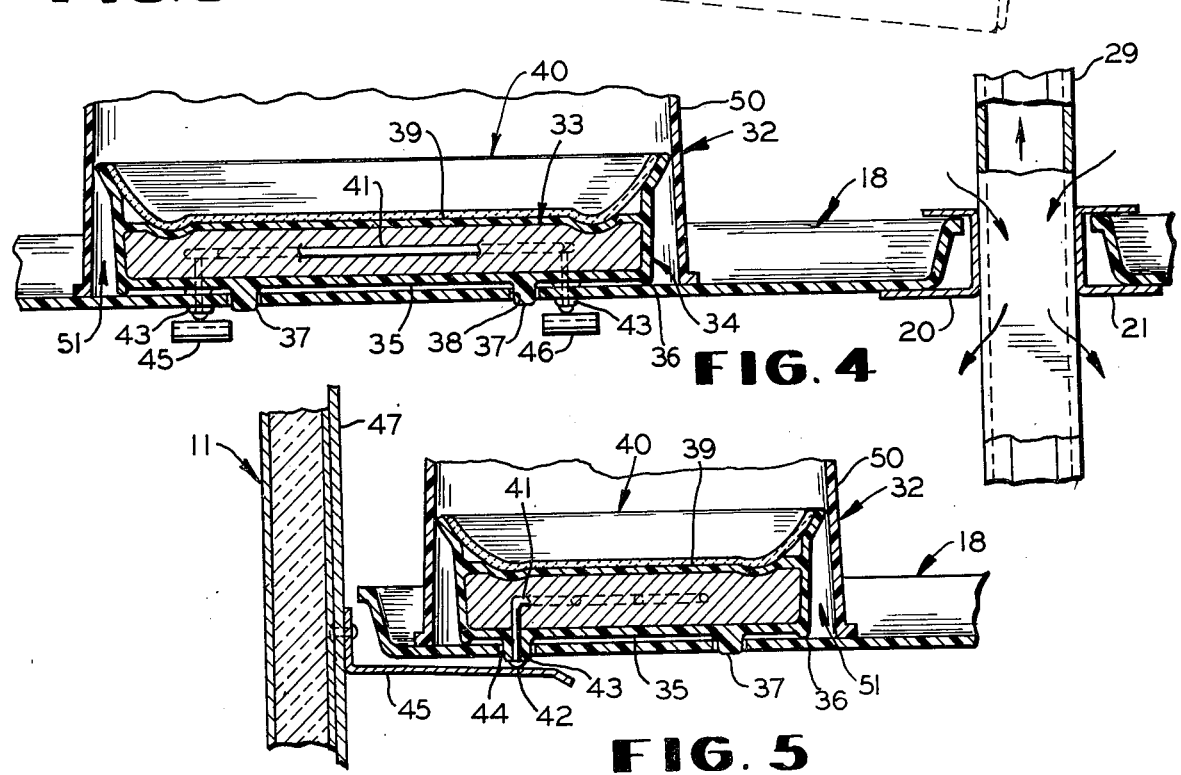
FIG. 4
FIG. 5

FOOD SERVICE SYSTEM

BACKGROUND OF THE INVENTION

In many large establishments, particularly in hospitals and, to a lesser degree, in factories, it has become the custom to prepare individual meals in a central kitchen and to provide means for transporting the meals to remote serving locations, such as the patients' rooms or small luncheonettes scattered around the factory. A similar food service system is utilized by most airlines where the meals to be served during flight are prepared on the ground, delivered to the plane in containers and served at a later time after the aircraft is airborne. Some of the systems utilize high frequency or so-called "radar", ranges which heat the foods to be served hot on board the airplane or at the remote serving location, for example on an upper floor in a hospital. Other establishments utilize food service systems which comprise divided trays loaded in compartmented carts at the food preparation center with portions of the cart maintained hot and other portions maintained cold to segregate the two types of food from each other. A popular system of this type is that disclosed in Rothman U.S. Pat. No. 3,160,452 and in Stentz and Conklin U.S. Pat. No. 3,275,393, and other patents illustrating systems of similar nature.

The divided tray type of system has several drawbacks, among them the necessity for both heating and cooling apparatus in the transportation carts, the difficulty of maintaining the free and easy operation of the means for separating the hot and cold compartments in the cart and yet providing for the tray to extend into both, limitations on the size of the various plates and food containing dishes, and problems of cleanliness and sterilization.

The systems employing the "radar" ranges for heating the foods to be served hot have an additional disadvantage particularly with respect to hospitals. Any system which requires the assembly of the hot and cold foods for a meal at the patient's floor or room makes it difficult to be sure that the proper hot food is placed with the proper cold food, when a meal is served to a patient on a particular restricted diet.

It is therefore the principal object of the instant invention to provide a food service system comprising a movable container, such as a wheeled cart, which has a rack for the transportion of a plurality of meal trays, each tray carrying components of a meal, both those to be served cold and those to be served hot, with the hot components in a thermally insulated heat retaining unit, the cart being adapted to be connected to a source of chilled air at any remote food service location in order to maintain the cold food at a refrigerated temperature while the foods to be served hot are either maintained at the elevated temperature in which they are inserted into the unit or the units are connected to a source of electrical energy for raising their temperature to a desired level while the cold foods are maintained at a refrigerated level.

BRIEF DESCRIPTION OF THE DRAWINGS

FIG. 3 is a fragmentary, horizontal sectional view taken along the line 3—3 of FIG. 2 and shown on an enlarged scale;

FIG. 4 is a fragmentary, vertical sectional view taken along the line 4—4 of FIG. 3 and shown on a still further enlarged scale;

FIG. 5 is a fragmentary, vertical sectional view taken along line 5—5 of FIG. 3 and shown on the same scale as FIG. 4.

DESCRIPTION OF PREFERRED EMBODIMENT

Figure 1:
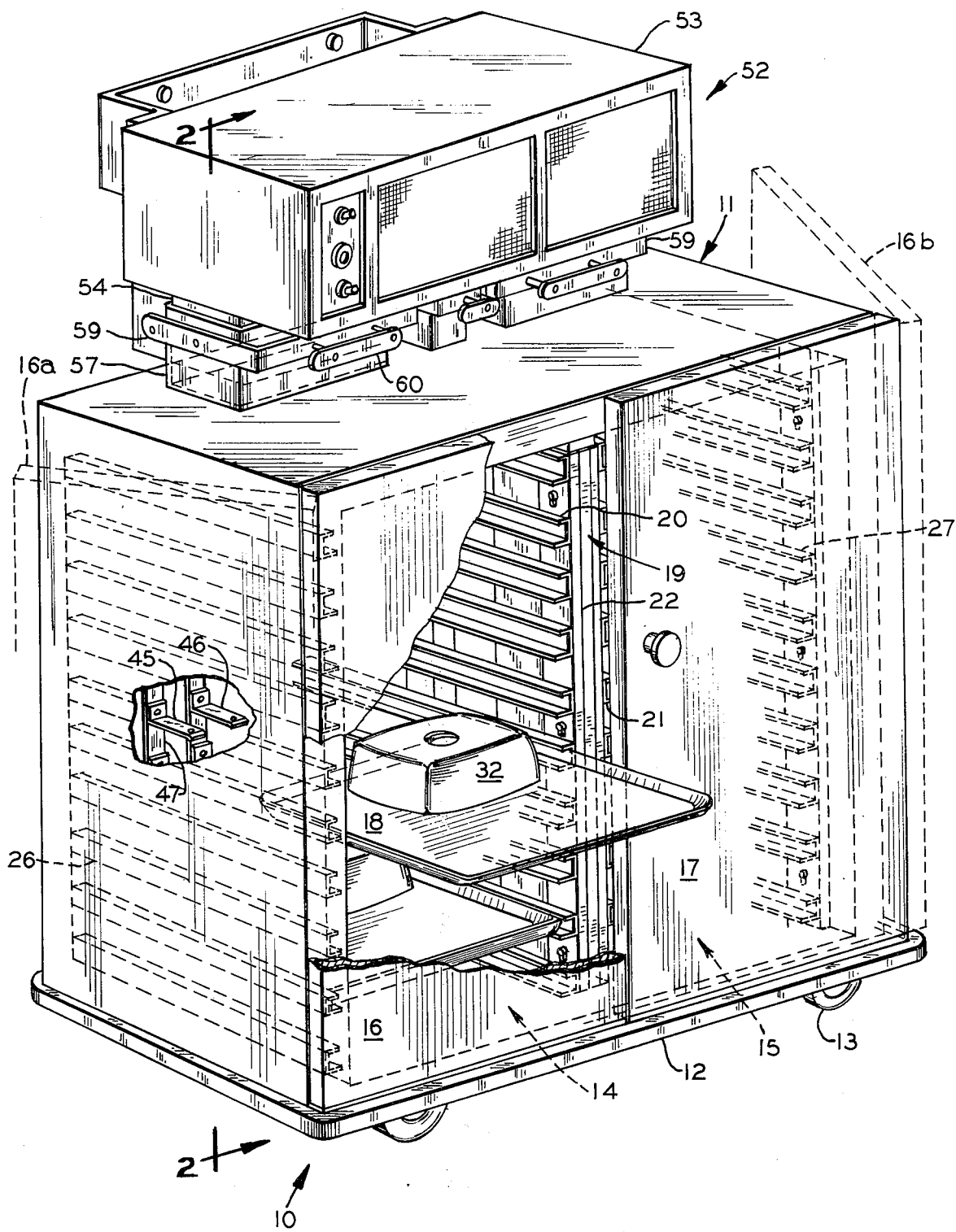
FIG. 1 is an isometric view of a meal delivery cart and associated apparatus which cooperate to provide a meal service system according to the invention, parts being broken away and parts being shown in phantom.

A meal transportation cart, generally indicated by the reference number 10 is illustrated as having a cabinet 11 erected on a base 12 and provided with wheels 13. The cabinet 11 in this embodiment has two tray compartments generally indicated by the reference numbers 14 and 15, each compartment being closed by a door 16 or 17 as the case may be. In FIG. 1 the door 16 is broken away to show the interior of the cabinet compartment 14 and both doors are shown in phantom, indicated by the reference numbers 16a and 16b, in their open positions to allow insertion or removal of a plurality of meal trays such as the tray 18 shown partly inserted in the compartment 14 in FIGS. 1 and 2.

The cabinet 11 has insulating walls at the top, ends and bottom and the doors 14 and 15 also are filled with thermal insulation.

A vertically extending skeleton partition, generally indicated by the reference number 19 separates the two tray compartments 14 and 15 and also acts as a support for central tray guides 20 and 21. The tray guides 20 and 21 are mounted on vertically extending rack bars 22 (see also FIG. 3) and the bars 22 are, in turn, removably mounted on pegs 23 which are studded into front and back posts 24 and which extend through keyholes 25 in the rack bars 22. An entire set of the tray guides 20 or 21 may thus be removed as a unit from the cart 10 in order to facilitate cleaning.

Side tray guides 26 and 27 are similarly mounted on vertical channels 28 (FIG. 2) and, although not shown in the drawings, the channels 28 with the tray guides 26 also may be removed from the cart for cleaning and sterilization.

The partition 19 also includes a pair of spaced air conduits 29. As can be seen best in FIG. 2, the conduits 29 are open at their lower ends, which are spaced somewhat above the bottom of the compartments 14 and 15, and are connected at their upper ends by a header 30 leading to a discharge air exhaust spout 31 which protrudes through the top of the cabinet 11. As will later be more fully explained, the conduits 29 are return air flow conduits to carry air out of the cabinet 11, thus to insure circulation of chilled air through the two tray compartments 14 and 15.

Each of the compartments 14 and 15, in the embodiment shown, is adapted to transport ten of the meal trays 18 so that twenty complete meals can be carried from the food preparation center to the service location and either arrive in good condition for service of both hot and cold foods, or, if desired, maintained in their proper temperatures at the service location for a considerable period of time or, even, be connected to a source of electrical energy at the service location for the purpose of heating the foods to be served hot which are positioned in hot food serving units 32 carried by the trays 18. While the hot food service unit 32 is the subject matter of my copending application, Ser. No. 448990, filed Mar. 7, 1974, now U.S. Pat. No. 3,875,370 in itself, the unit also is an integral and essential part of the food service system embodying the instant invention.

Each of the heat retaining food service units 32 comprises a body 33 fabricated from a heat-retaining material such as commercial grade aluminum enclosed in a molded jacket 34 of thermoplastic polyester resin, for example, "Valox" produced by General Electric, or the like. The jacket 34 has a bottom 35 around the perimeter of which there is integrally formed a rib 36 which spaces the bottom surface of the bottom 35 upwardly from the surface of the tray 18 with which it is associated, to provide a dead air space therebetween. A pair of positioning lugs 37 are molded on the bottom 35 and protrude downwardly through appropriately spaced holes 38 in the tray 18 to position the jacket 34 on the tray 18. A top 39 of the jacket 34 is molded to have a configuration which is complementary to a food dish 40, conveniently also fabricated from plastic such as melamine, or china, or the like. Preferably the top 39 of the jacket 34 is thinner in section than its bottom 35 thus more readily to transfer heat from the body 33 to the dish 40 and to the food contained in the dish 40.

An electrical resistance heating element 41 is embedded in the body 33 and connected to a pair of contact buttons 42 which protrude downwardly through a second set of lugs 43 molded in the bottom 35 of the jacket 34. The lugs 43 extend downwardly through holes 44 in the tray 18.

A plurality of pairs of leaf contacts 45–46 are carried by two vertically extending bus bars 47 and 48 which are mounted at the rear of the cabinet 11. The bus bars 47 and 48 are attached by insulating connectors (not shown) to the back wall of the cabinet 11 and electrically connected to a junction box 49 at the rear of the cart 10.

Each of the hot food serving units 32 also has a dome-shaped insulating cover 50 of plan configuration telescoping over the jacket 34 and having a skirt which fits closely circumjacent the lip of the jacket 34, resting on the tray 18 and thus providing an annular dead air space 51 (FIGS. 4 and 5) extending around the perimeter of the jacket 34. The cover 51 has sufficient height so that it overlies hot foods resting on the dish 40 and slides in beneath the next uppermost tray 18 when the trays are inserted into the tray guides 20–26 or 21–27.

It will be remembered that the food service system embodying the invention comprehends the service of both hot and cold foods on each of the individual trays 18. At the food preparation center foods to be served cold such as salads, ice cream, butter, milk, and the like, are placed in their individual service dishes and those dishes are arranged on the trays 18 in the areas not occupied by the heat-retaining hot food service units 32. Similarly, the foods to be served hot such as main dishes, meat and potatoes and the like, are placed in the respective dish 40, the dish 40 placed in one of the jackets 34, covered by its respective cover 50 and positioned on a tray 18 by means of the locating lugs 37 and contact lugs 43. Each tray 18 with its individual complete meal is then slid into one of the compartments 14 and 15. After the group of trays, in this case twenty, has been assembled in a particular cart 10, that cart is moved to the food service area. If the system is being employed on aircraft a plurality of the carts 10 might be loaded aboard an aircraft in the galley thereof.

Figures 2, 6:
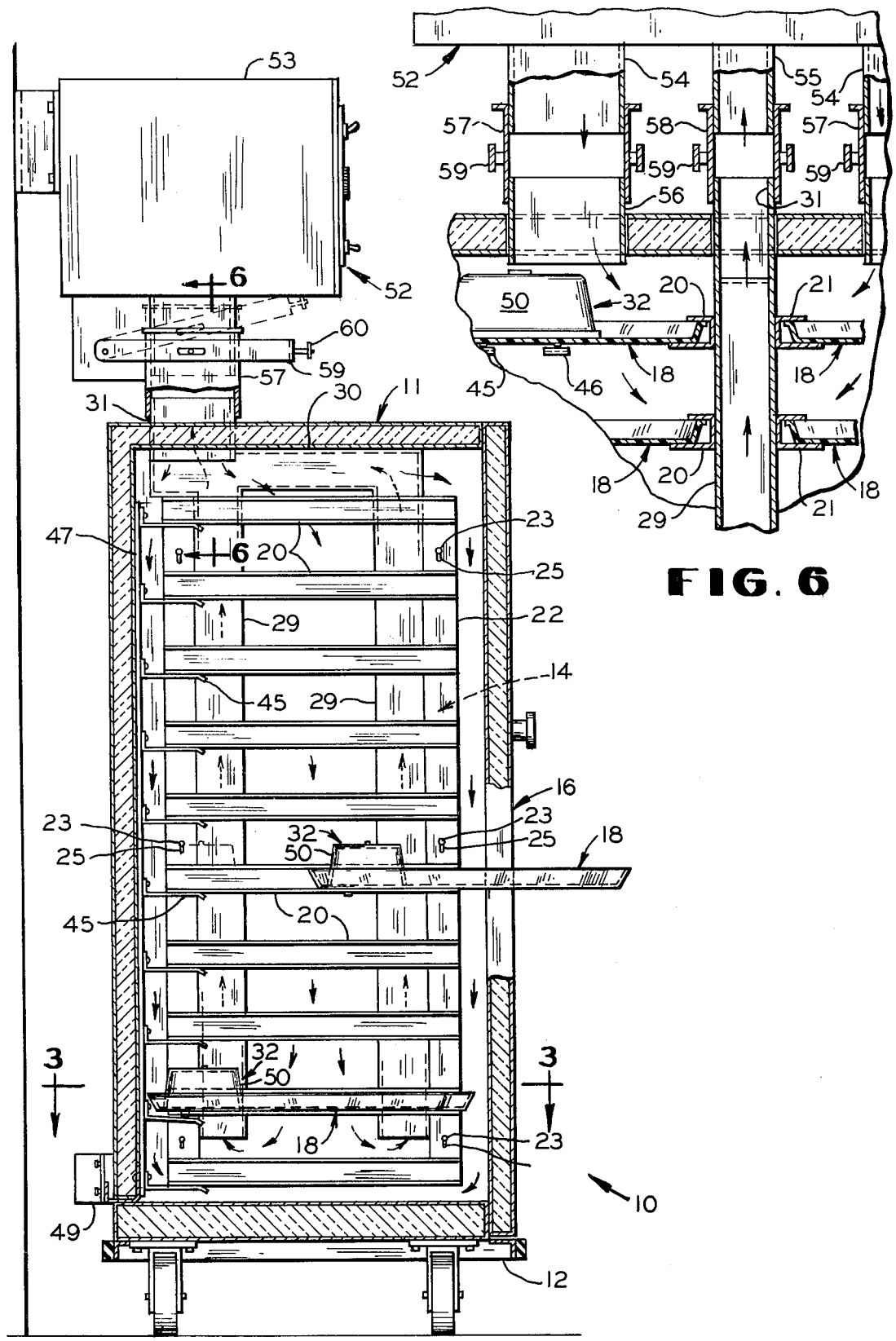
FIG. 2 is a vertical, sectional view taken from the position indicated with line 2—2 of FIG. 1.
FIG. 6 is a fragmentary, vertical sectional view taken along the line 6—6 of FIG. 2 and illustrated on an enlarged scale.

At the food service location, for example, the floor of a hospital or the galley of an aircraft, or any other location from which individual, complete meals are to be delivered, the system comprises a chilled air generating unit generally indicated by the reference number 52 (FIGS. 1, 2 and 6). The chilled air unit 52 comprises a compressor, evaporator, etc. in order to provide a supply of cold air for circulation throughout the try cabinet 11. The unit 52 has a cabinet 53 mounted on a wall bracket with two spaced air output ducts 54 and an air return duct 55. The ducts 54 and 55 protrude downwardly from the air conditioning cabinet 53 and are spaced with, and of such size as to align with, the return air spout 31 and a pair of spaced input spouts 56 which extend through the top of the cabinet 11 into the respective tray compartments 14 and 15.

Three vertically adjustable couplers 57 for the air output ducts 54 and spouts 56, and 58 for the return air duct 55 and return air spout 31, are carried by rockers 59. Each of the rockers 59 is a U-shaped bracket pivotally connected at the rear of its arms to a member depending from the air conditioning cabinet braces 53. Each of the rockers 59 embraces and is pivotally connected to, its respective coupler 57 or 58 and has a handle 60 at its front. By lifting the respective rocker 59 upwardly, i.e., from the solid line position in FIG. 2 to the dotted line position thereof, its coupler is raised above the top of the respective spout 31 or 55. After the cart then has been moved into proper position beneath the chilled air units 52, the couplers 57 and 58 are lowered to fit over the respective one of the spouts 56 or 31 to place the cold air duct 54 in communication with the interior of the tray compartments 14–15 and the return air duct 55 in communication with the return air spout 31.

The apparatus embodying the food surface system of the invention may be utilized in any one of three alternative ways with respect to the hot foods:

1. The heat-retaining units comprising the aluminum bodies 37 and jackets 34 may be heated in a suitable oven to an elevated temperature of 180°F. or so. The hot foods are cooked and placed upon the service dishes 40. The dishes 40 with the hot foods are assembled in the units 32 and each unit 32 is placed upon one of the trays 18 and covered by its insulating cover 50. The cold foods are placed on the respective trays 18. The loaded trays are then inserted into the carts 10, the carts closed and moved to the food service area. In this mode of operation, it is contemplated that the meals will be served rather quickly after the arrival of the loaded cart at the food service location, say certainly in less time than one hour. For such a period of time the heated units 32 maintain the hot foods at service temperature and the chilled air fed into the cart 10 as described keeps the cold foods at an appropriate cold temperature, said 37°F.

2. The heat-retaining hot food units are heated and loaded as described above and placed in the carts. The carts are moved to the food service location. Where the length of time at the food service location is to be of some duration prior to the time when the meals are served, the junction box 49 is connected to a source of electrical current, say at 12 volts, and electrical energy is applied to the bus bars 47 and by the leaf contacts 45 and 46 to each of the individual units 32 to prevent substantial loss of heat and reduction in temperature of the hot foods. In this mode of operation the foods can be kept at a palatable, attractive temperature for periods in excess of an hour.

3. A third mode of operation contemplates loading all foods, both that to be served hot and that to be served cold, onto the tray 18 with the foods ultimately to be served hot placed in the units 32 but all at a temperature of 37°F. After the cart is loaded it is then moved to the food service location and connected to the refrigeration or chilled air unit 52 maintaining all of the food at a temperature of say 37°F. At a time properly in advance of the time when the meals actually are to be served to provide for heating the foods in the units 32, a suitable switch in the control panel at the location is closed to energize the units 32 to heat up the foods in the hot food dishes. Because of the insulating covers 50 and the dead air spaces 51 and the spaces circumscribed by the ribs 36, the heat generated in the heat retaining bodies 33 is not dissipated into the compartment 11 but a very high proportion utilized for raising the temperature of the food inside the units 32 from the 37° F. temperature to say 180°F.

I have found that with an average meal comprising a meat and one or two vegetables which are to be served hot, a period of time of approximately one hour is required in a device constructed according to the invention to raise the temperature of the food interiorally of the units 32 from the chilled temperature of 37°F. to a serving temperature of 180°F. When the period of time necessary to achieve this temperature has elapsed or, if desired, when a temperature sensing device which may be placed in one or more of the units 32 has indicated the temperature desired, the food service person removed the tray from the cart 10 and delivers it to the patient. The cover 50 is lifted off of the unit 32 and the hot foods contained in the dish 40 will remain at a pleasantly warm or hot temperature during consumption by the person served. Indeed, by reason of the heat retaining capabilities of the aluminum mass in the body 33, the food will remain at comfortable eating temperature for a period of say two hours or more.

The provision of both the heat retaining bodies 33 in their jackets 34 with their insulating covers 50 and the resistant heating elements 41 interiorly thereof results in a food service system having great flexibility so that the same materials, procedures and equipment may be utilized for food service in any one of the three procedures outlined above.

Yet another way of utilization of the equipment embodying the invention is to heat the heat retaining units 32 as described above, place hot foods in those units, place the cold foods on the trays 18 and the units 32 on their respective trays, then to insert them all into the cabinet 11 and to close its doors 16. The cart is then connected to a chilled air unit 52, located however, in this instance, at the food preparation center. The cart remains connected to said chilled air source until such time as the entire interior of the cabinet 11 is filled with chilled air. The cart then is disconnected from the chilled air unit 32 and the respective spouts 31 and 56 are closed with insulating covers. At this point the cart contains hot foods in the individual units 32 and cold foods in a chilled atmosphere. The carts may then be wheeled to the food service location and the meals served within a reasonably short time if not immediately. By reason of the heated bodies 32 the hot foods will remain hot and by reason of the chilled air in the cabinet 11 the cold foods will remain cold thus keeping all of the meals in palatable condition.

I claim:

1. A food service system comprising, in combination,
   a. an insulated cabinet for transporting and storing a plurality of complete meals on individual trays,
   b. an individual heat-retaining hot food storage unit for each of the meals to be transported in said cabinet, each of said units having a heatable element capable of retaining heat for a substantial period of time, a jacket around said element, a food surface and a dome-shaped insulating cover,
   c. a plurality of individual meal service trays adapted to fit within said cabinet in a vertical spaced array, each of said food trays having a general area for cold foods and a specific area for one of said hot food storage units,
   d. a tray rack in said cabinet for supporting a plurality of said food trays with cold foods for an individual meal and one of said hot food storage units on each of said trays,
   e. input and exhaust air flow ducts on said cabinet, and
   f. a chilled air supply unit having output and return air ducts and means for coupling said output and input ducts and said exhaust and return ducts for circulating chilled air through said cabinet and exteriorly about said hot food storage units and said cold food areas in said individual trays.

2. A system according to claim 1 in which each of said hot food service units comprises a heat retaining body, a food plate adapted to lie adjacent thereto in heat transferral relationship and an insulating cover enclosing said body and plate and the food therein when said cover is in place thereover.

3. A system according to claim 2 in which each of said hot food service units has an electrical resistance heater in the body thereof and the enclosure has electrical energy delivery means for connection to said heaters for applying electrical energy to said heaters and heat to food in said units.

4. A system according to claim 3 in which said meal service trays and said heat-retaining hot food service units have cooperating location means for said units on said trays for connection to said energy delivery means.

5. Apparatus for transporting to and for serving meals comprising both hot and cold foods at a location remote from the location at which the food is prepared, said apparatus comprising,
   a. a plurality of identical individual meal service trays having areas thereon for cold foods,
   b. a plurality of identical individual meal heat retaining hot food storage and serving units placed on said trays,
   c. each of said units having a heatable element capable of retaining heat for a substantial period of time, a jacket around said element, a food surface and a dome-shaped insulating cover,
   d. an insulated cabinet having interior rack means for carrying a plurality of said trays with said units thereon from the food preparing location to the food serving location,
   e. input and exhaust air flow ducts on said cabinet, and
   f. a chilled air supply unit having output and return air ducts and means for coupling said output and input ducts and said exhaust and return ducts for circulating chilled air through said cabinet and exteriorly about said hot food storage units and said cold food areas in said individual trays.

6. Apparatus according to claim 5 in which each of said heat-retaining hot food serving units also comprises an electrical heating element and contacts for said element protruding therefrom, the trays and said units having cooperating means for positioning said units on said trays and in which said cabinet has electrical contacts aligned with said rack means and said unit contacts when on said trays and in said cabinet.

7. An apparatus according to claim 5 in which the device for supplying chilled air is located at the food serving location.

8. An apparatus according to claim 5 in which the cabinet is the body of a cart which can be rolled from place to place.

9. An apparatus according to claim 8 in which the device for supplying chilled air has spaced output and return air ducts and said cart has similarly spaced input and exhaust air spouts which align with said ducts.

10. A method for delivery of meals comprising hot and cold foods at a meal service location remote from a food preparation center, said method comprising the steps of, a. placing each individual serving of foods to be served hot in an individual heat-retaining hot food storage unit, b. individually enclosing said individual serving against heat loss to ambient atmosphere, c. placing each of said hot food storage units in a predetermined location on an individual meal service tray having cold food areas thereon and placing cold foods on such cold food areas, d. enclosing a plurality of said service trays in an insulated cabinet against ambient temperatures, e. transporting said cabinet to a meal service location, f. supplying chilled air to the interior of said cabinet exteriorly about said hot food storage units and to the cold foods on said trays, g. providing heat to said heat-retaining food storage units during the carrying out of said method, and h. removing each of said trays from said cabinet and serving the meal thereon.

11. A method according to claim 10 in which the heat-retaining hot food storage units are heated before food to be served hot is placed therein.

12. A method according to claim 10 in which the food to be served hot is placed in said heat-retaining hot food storage units while said units are cold and heat is provided to said units and food to be served hot after said foods are conveyed to the serving location while chilled air is being supplied to said cabinet.

* * * * *